(12) United States Patent
Brown (10) Patent No.: US 11,297,804 B1
(45) Date of Patent: Apr. 12, 2022

(54) WEATHERPROOF BIRD FEEDER

(71) Applicant: John C. Brown, Dunbarton, NH (US)

(72) Inventor: John C. Brown, Dunbarton, NH (US)

( * ) Notice: Subject to any disclaimer, the term of this patent is extended or adjusted under 35 U.S.C. 154(b) by 154 days.

(21) Appl. No.: 16/930,772

(22) Filed: Jul. 16, 2020

(51) Int. Cl.
*A01K 39/012* (2006.01)

(52) U.S. Cl.
CPC .................... *A01K 39/012* (2013.01)

(58) Field of Classification Search
CPC .. A01K 39/012; A01K 39/01; A01K 39/0113; A01K 39/0125
See application file for complete search history.

(56) References Cited

U.S. PATENT DOCUMENTS

| | | | | |
|---|---|---|---|---|
| 4,838,205 A | * | 6/1989 | Larson | A01K 39/012 119/52.2 |
| 5,195,460 A | * | 3/1993 | Loken | A01K 39/012 119/52.3 |
| 5,235,935 A | | 8/1993 | Edwards | |
| 5,289,796 A | | 3/1994 | Armstrong | |
| 5,361,723 A | * | 11/1994 | Burleigh | A01K 39/0113 119/52.3 |
| 5,533,467 A | * | 7/1996 | Lancia | A01K 39/012 119/57.9 |
| 5,791,286 A | * | 8/1998 | Taussig | A01K 39/012 119/52.2 |
| 5,829,384 A | | 11/1998 | Landry | |
| 6,269,771 B1 | | 8/2001 | Cotter | |
| 7,198,004 B1 | | 4/2007 | Lush | |
| 7,302,911 B1 | | 12/2007 | Lush | |
| 7,921,808 B2 | | 4/2011 | Frazier | |
| 8,985,052 B1 | | 3/2015 | Lush | |
| 9,826,719 B1 | * | 11/2017 | Myrberg, III | A01K 39/014 |
| 2003/0127056 A1 | * | 7/2003 | Chrisco | A01K 39/014 119/52.2 |
| 2011/0088626 A1 | * | 4/2011 | Hepp | A01K 39/012 119/52.4 |
| 2014/0261200 A1 | * | 9/2014 | Tu | A01K 39/012 119/57.8 |
| 2015/0359202 A1 | * | 12/2015 | King | A01K 39/01 119/61.5 |
| 2017/0094949 A1 | * | 4/2017 | Haberle | A01K 39/0113 |
| 2017/0181411 A1 | * | 6/2017 | King | A01K 39/01 |

* cited by examiner

*Primary Examiner* — Trinh T Nguyen
(74) *Attorney, Agent, or Firm* — Cramer Patent & Design, PLLC; Aaron R. Cramer (57) ABSTRACT

The storm proof bird feeder may comprise a feed dispensing tube, a feeding plate, a floating collar, and a seed reservoir. The storm proof bird feeder may be a feeding station adapted to feed birds. The feed dispensing tube may dispense bird seed from the seed reservoir onto the feeding plate from whence the bird seed may be consumed. A gap height of a seed gap between the bottom of the feed dispensing tube and the feeding plate may be adjustable such that the gap height may be changed in correlation with the size of the bird seed being dispensed. The adjustment of the gap height and the use of the floating collar surrounding the feed dispensing tube may improve the operation of the storm proof bird feeder in adverse weather conditions.

20 Claims, 6 Drawing Sheets

WEATHERPROOF BIRD FEEDER

RELATED APPLICATIONS

None.

FIELD OF THE INVENTION

The presently disclosed subject matter is directed to a bird feeder more specifically to a weatherproof bird feeder.

BACKGROUND OF THE INVENTION

Many people enjoy viewing birds and in order to attract them, place bird feeders in their yards. These feeders not only attract the birds—thereby providing a pleasurable viewing opportunity, but they also serve as a means to provide food for the birds in the winter months when the birds' natural supply of food may be difficult to procure.

One difficulty in providing such food during the winter months or during a rainy season is that the elements can make it difficult for the birds to access the food in a feeder. Whether covered in snow or damaged by rain—the need to protect the access to and food quality of a given bird feeder is often an ongoing struggle for the owner of the bird feeder.

Various attempts have been made to provide bird feeders which seemingly provide weather protection. U.S. Pat. No. 8,985,052, issued in the name of Lush, describes a, "[a] bird feeder of the tube-type having a vertically disposed hollow body portion formed of a clear plastic material. The body portion has a plurality of inverted, truncated funnel members or baffles positioned therein in a vertically spaced-apart relationship which maintain a certain amount of feed at that level even though the main feed supply has dropped below that funnel member or baffle."

While such a device(s) fulfills its respective, particular objectives, each of these references suffer from one (1) or more of a disadvantage in that weather and the elements are not effectively kept at bay. Accordingly, there exists a need for a bird feeder that maintains access to bird feed while protecting the feed from the elements. The development of the present invention substantially departs from the conventional solutions and in doing so fulfills this need.

SUMMARY OF THE INVENTION

The principles of the present invention provide for a storm proof bird feeder which comprises a feed dispensing tube which has a top end, a bottom end, an upper aperture, and a lower aperture. The storm proof bird feeder also comprises a feeding plate which has a horizontally-oriented panel which is suspended below the feed dispensing tube by a plurality of gap adjusters and a plurality of adjuster apertures. Each of the gap adjusters include a top anchor, an adjuster hanger, and an adjustable coupler. The storm proof bird feeder also comprises a floating collar which has a windscreen that encircles the bottom end of the feed dispensing tube. The floating collar has a top collar aperture, a bottom collar aperture, and a plurality of side notches.

The storm proof bird feeder also comprises a seed reservoir which contains the bird seed for one or more birds to consume. The seed reservoir has a front side, a rear side, a left side, a right side, a bottom panel, and a lid. The bottom panel includes an outflow aperture, and the bird seed contained within the seed reservoir flows out of the bottom of the seed reservoir through the outflow aperture and into the feed dispensing tube. The storm proof bird feeder also comprises a gap height of a seed gap which is formed between the bottom of the feed dispensing tube while the feeding plate is adjustable such that the gap height is changed in correlation with the size of the bird seed dispensed. The gap height is adjusted to match the size of the bird seed being dispensed and having the seed gap surrounded by the floating collar to minimize the amount of dispensed seed that is blown away by wind.

The upper aperture may be an opening at the top end of the feed dispensing tube which allows the bird seed to fall from the seed reservoir into the feed dispensing tube that dispenses the bird seed from the seed reservoir onto the feeding plate from whence the bird seed may be consumed. The feed dispensing tube may be tapered into a frustum of an inverted cone. The gap adjusters may couple to the feeding plate via the adjuster apertures. The top anchor may be coupled to the underside of the bottom panel of the seed reservoir. The top end of the adjuster hanger may be coupled to the top anchor and the bottom end of the adjuster hanger may be coupled to the adjustable coupler.

The adjustable coupler may be coupled to the feeding plate and the length of the adjustable coupler from the top of the adjustable coupler to the feeding plate may be adjustable. Adjusting the length of the adjustable coupler may alter the gap height of the seed gap between the feed dispensing tube and the feeding plate. The adjustable coupler may include an eye bolt, a wing nut, and a jam screw. An eye of the eye bolt may be coupled to the adjuster hanger and a threaded shank of the eye bolt passes through one of the adjuster apertures on the feeding plate. The wing nut may screw onto the threaded shank of the eye bolt below the feeding plate such that the feeding plate rests on the wing nut. The jam screw may be tightened to jam the wing nut such that the length of the adjustable coupler remains constant.

The jam screw may be located above the feeding plate and tighten downwards against the feeding plate or the jam screw located beneath the wing nut and tighten upwards against the wing nut. The floating collar may be tubular in shape with the feed dispensing tube oriented vertically. The feed dispensing tube may descend through the top collar aperture located at the top of the floating collar. The side notches may be openings in the side of the floating collar that are adjacent to the bottom collar aperture. The side notches may connect to the bottom collar aperture and the floating collar may provide the one or more birds access to the dispensed seed via the side notches. The front side, the rear side, the left side, the right side, or combinations thereof are transparent such that the level of the bird seed within the seed reservoir may be visible from outside of the seed reservoir. The lid may be hinged and elevated higher than the opposing side of the lid such that rain flows off of the lid. The gap height may be decreased for smaller seeds and may be increased for larger seeds.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 100 storm proof bird feeder
200 feed dispensing tube
202 upper aperture
204 lower aperture
210 feeding plate
214 plurality of gap adjusters
222 top anchor
224 adjuster hanger
226 adjustable coupler
228 length
230 eye bolt
232 eye
234 threaded shank
236 wing nut
238 jam screw
240 floating collar
242 top collar aperture
244 bottom collar aperture
246 plurality of side notches
250 seed reservoir
252 front side
254 rear side
256 left side
258 right side
260 bottom panel
262 outflow aperture
270 lid
272 hinge
274 lid latch
276 plurality of hanger couplers
290 seed gap
292 gap height
900 bird seed
902 dispensed seed

DESCRIPTION OF THE INVENTION

Figure 1:
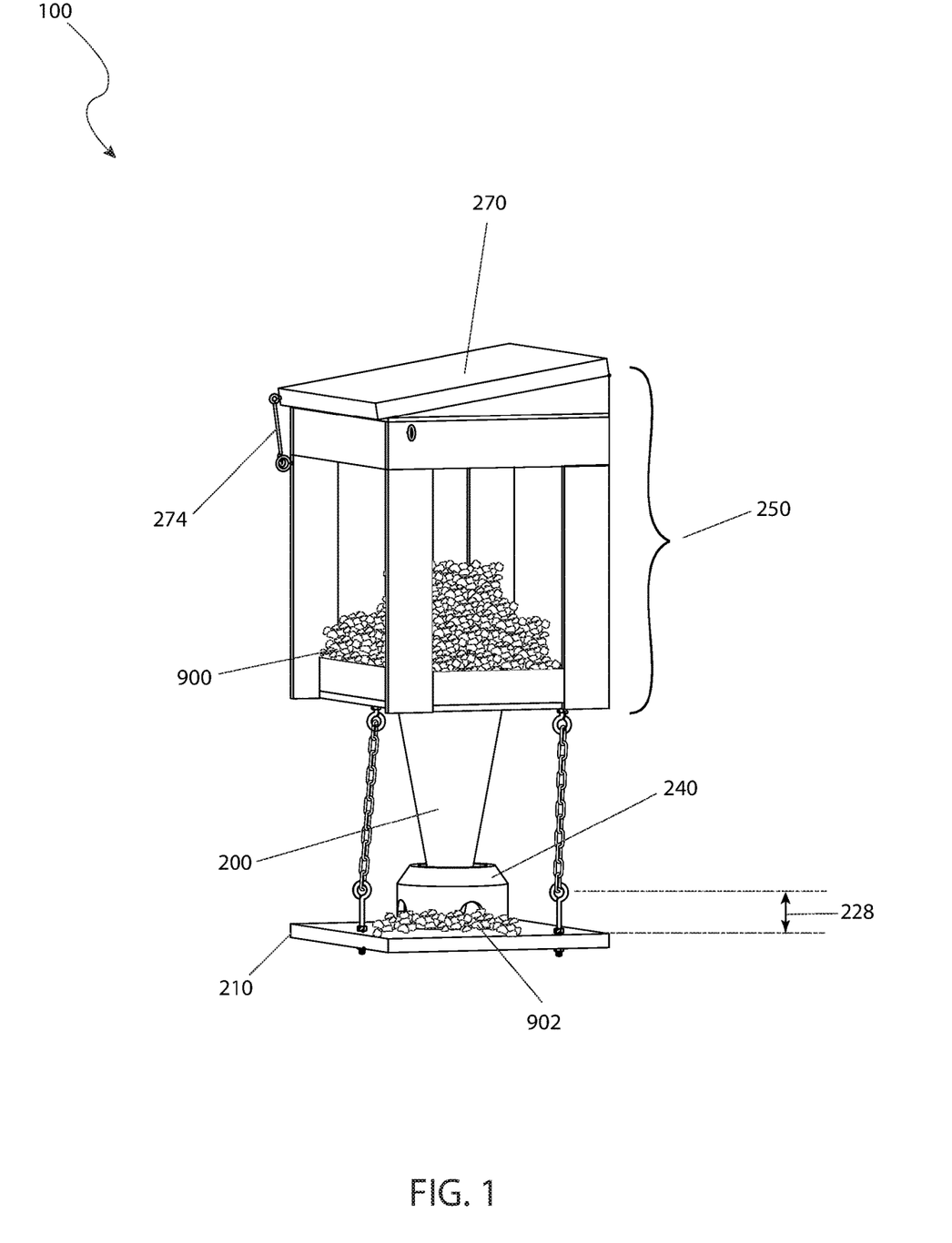
FIG. 1 is an isometric view of a storm proof bird feeder, according to an embodiment of the present invention.

The present invention is directed to a storm proof bird feeder (herein described as the "invention") 100. The invention 100 may comprise a feed dispensing tube 200, a feeding plate 210, a floating collar 240, and a seed reservoir 250. The invention 100 may be a feeding station adapted to feed birds. The feed dispensing tube 200 may dispense bird seed 900 from the seed reservoir 250 onto the feeding plate 210 from whence the bird seed 900 may be consumed. A gap height 292 of a seed gap 290 between the bottom of the feed dispensing tube 200 and the feeding plate 210 may be adjustable such that the gap height 292 may be changed in correlation with the size of the bird seed 900 being dispensed. The adjustment of the gap height 292 and the use of the floating collar 240 surrounding the feed dispensing tube 200 may improve the operation of the invention 100 in adverse weather conditions. As a non-limiting example, having the gap height 292 adjusted to match the size of the bird seed 900 being dispensed and having the seed gap 290 surrounded by the floating collar 240 may minimize the amount of dispensed seed 902 that is blown away by wind. For smaller seeds such as millet and thistle, the gap height 292 may be decreased. For larger seeds such as sunflower seeds, the gap height 292 may be increased. FIG. 1 illustrates an embodiment of the invention 100 with the bird seed 900.

The feed dispensing tube 200 may be a conduit for the bird seed 900 to travel from the seed reservoir 250 to the feeding plate 210. The top of the feed dispensing tube 200 may couple to a bottom panel 260 of the seed reservoir 250. The feed dispensing tube 200 may comprise an upper aperture 202 and a lower aperture 204. The upper aperture 202 may be an opening at the top end of the feed dispensing tube 200 which allows the bird seed 900 to fall from the seed reservoir 250 into the feed dispensing tube 200. The lower aperture 204 may be an opening at the bottom end of the feed dispensing tube 200 which allows the bird seed 900 to fall out of the feed dispensing tube 200 onto the feeding plate 210. The interior of the feed dispensing tube 200 may be hollow such that the bird seed 900 may pass from the upper aperture 202 to the lower aperture 204. In a preferred embodiment, the feed dispensing tube 200 may be tapered to the shape of a frustum of an inverted cone.

The feeding plate 210 may be a horizontally-oriented panel suspended below the feed dispensing tube 200 by a plurality of gap adjusters 214. The feeding plate 210 may comprise a plurality of adjuster apertures. The plurality of gap adjusters 214 may couple to the feeding plate 210 via the plurality of adjuster apertures.

An individual gap adjuster may comprise a top anchor 222, an adjuster hanger 224, and an adjustable coupler 226. The top anchor 222 may be coupled to underside of the bottom panel 260 of the seed reservoir 250. The top end of the adjuster hanger 224 may couple to the top anchor 222 and the bottom end of the adjuster hanger 224 may couple to the adjustable coupler 226. The adjustable coupler 226 may be coupled to the feeding plate 210. A length 228 of the adjustable coupler 226 from the top of the adjustable coupler 226 to the feeding plate 210 may be adjustable. Adjusting the length 228 of the adjustable coupler 226 may alter the gap height 292 of the seed gap 290 between the feed dispensing tube 200 and the feeding plate 210. In some embodiments, the adjuster hanger 224 may be a chain.

Figure 2:
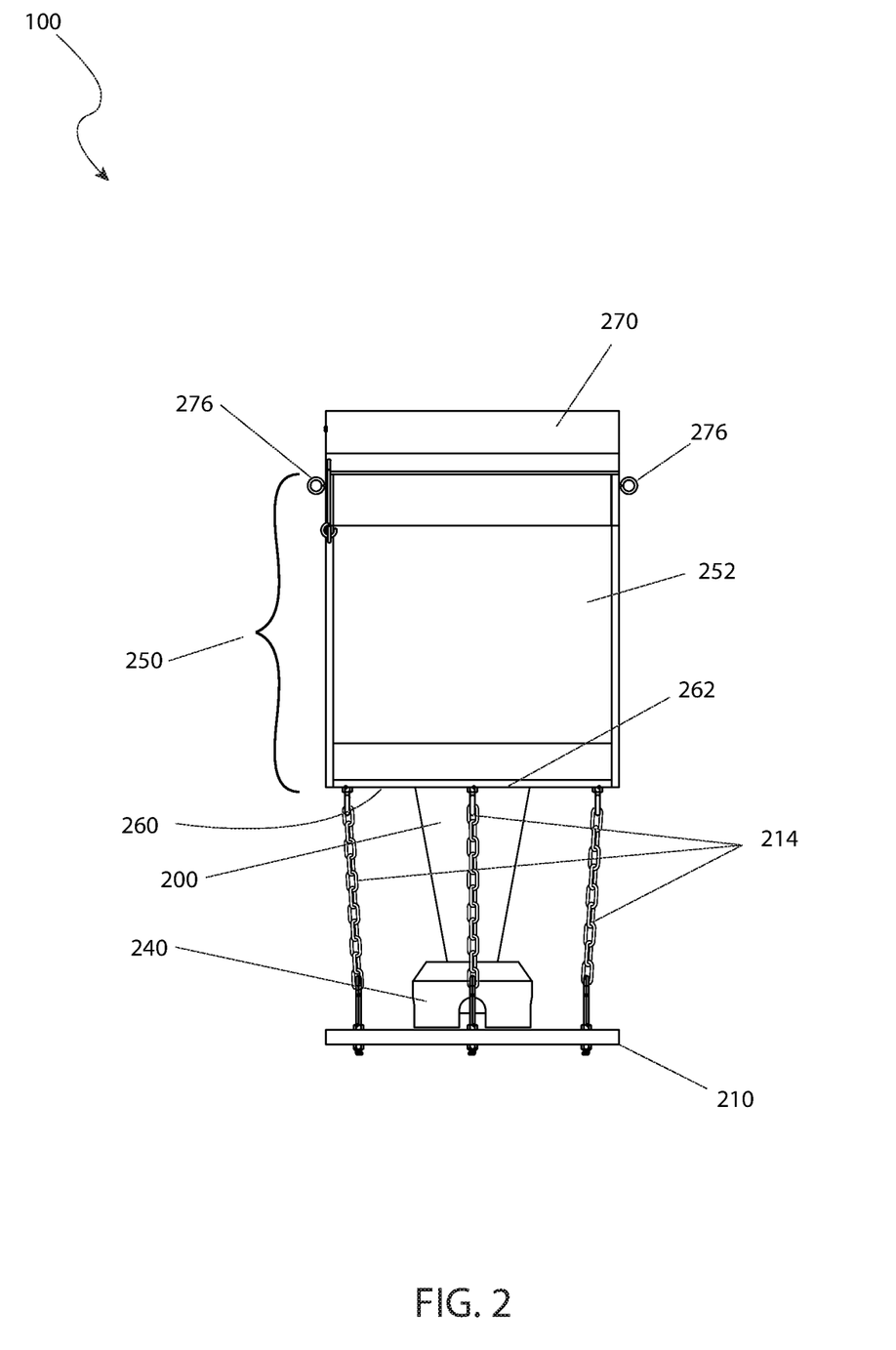
FIG. 2 is a front view of a storm proof bird feeder, according to an embodiment of the present invention.
Figure 3:
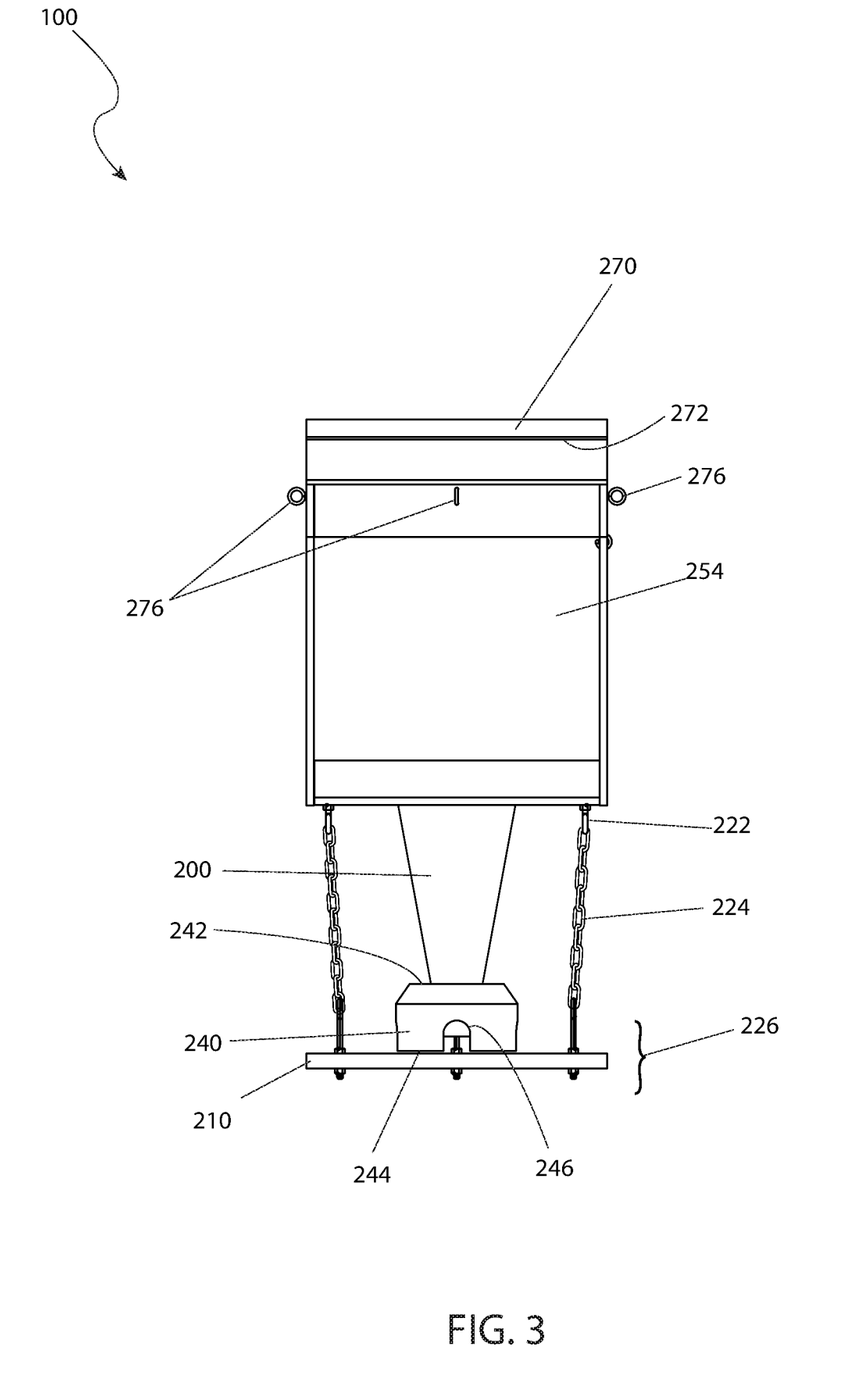
FIG. 3 is a rear view of a storm proof bird feeder, according to an embodiment of the present invention.

The adjustable coupler 226 may comprise an eye bolt 230, a wing nut 236, and a jam screw 238. An eye 232 of the eye bolt 230 may be coupled to the adjuster hanger 224. A threaded shank 234 of the eye bolt 230 may pass through one of the plurality of adjuster apertures on the feeding plate 210. The wing nut 236 may screw onto the threaded shank 234 of the eye bolt 230 below the feeding plate 210 such that the feeding plate 210 rests on the wing nut 236. The jam screw 238 may be tightened to jam the wing nut 236 such that the length 228 of the adjustable coupler 226 remains constant. The jam screw 238 may be located above the feeding plate 210 and may tighten downwards against the feeding plate 210 or the jam screw 238 may be located beneath the wing nut 236 and may tighten upwards against the wing nut 236. The feeding plate 210 suspended below the seed reservoir 250 and the feed dispensing tube 200 is illustrated in FIG. 2 (viewed from the front). The gap height 292 between the bottom of the feed dispensing tube 200 and the feeding plate 210 is clearly seen in FIG. 3 (viewed from the rear).

The floating collar 240 may be a windscreen that encircles the bottom end of the feed dispensing tube 200. The floating collar 240 may be tubular in shape with the tube oriented vertically. The floating collar 240 may comprise a top collar aperture 242, a bottom collar aperture 244, and a plurality of side notches 246. The feed dispensing tube 200 may descend through the top collar aperture 242 located at the top of the floating collar 240. The bottom of the floating collar 240 may rest upon the feeding plate 210 and the bottom collar aperture 244 may allow the floating collar 240 to be lifted above the feeding plate 210 such that the feed dispensing tube 200 passes completely through the floating collar 240. The plurality of side notches 246 may be openings in the side of the floating collar 240 that are adjacent to the bottom collar aperture 244. In some embodiments, the plurality of side notches 246 may connect to the bottom collar aperture 244. The floating collar 240 may be adapted to provide the birds access to the dispensed seed 902 via the plurality of side notches 246.

The seed reservoir 250 may be a container for the bird seed 900. The seed reservoir 250 may comprise a front side 252, a rear side 254, a left side 256, a right side 258, the bottom panel 260, and a lid 270. The left edge of the front side 252 may be coupled to the front edge of the left side 256. The right edge of the front side 252 may be coupled to the front edge of the right side 258. The bottom edge of the front side 252 may be coupled to the front edge of the bottom panel 260. The left edge of the rear side 254 may be coupled to the rear edge of the left side 256. The right edge of the rear side 254 may be coupled to the rear edge of the right side 258. The bottom edge of the rear side 254 may be coupled to the rear edge of the bottom panel 260. The bottom edge of the left side 256 may be coupled to the left edge of the bottom panel 260. The bottom edge of the right side 258 may be coupled to the right edge of the bottom panel 260. As described herein, the seed reservoir 250 may have a square or rectangular footprint. However, those skilled in the art will recognize that the number of sides and the shape of the bottom panel 260 may be modified to give the seed reservoir 250 other geometric shapes and footprints without departing from the spirit and scope of the invention 100. As non-limiting examples, five (5) or six (6) side panels may be used when the bottom panel 260 is shaped to resemble a pentagon or a hexagon.

The bottom panel 260 may comprise an outflow aperture 262. The bird seed 900 contained within the seed reservoir 250 may flow out of the bottom of the seed reservoir 250 through the outflow aperture 262 and into the feed dispensing tube 200.

In some embodiments, the front side 252, the rear side 254, the left side 256, the right side 258, or combinations thereof may be fully or partially transparent such that the level of the bird seed 900 within the seed reservoir 250 may be visible from outside of the seed reservoir 250.

Figure 4:
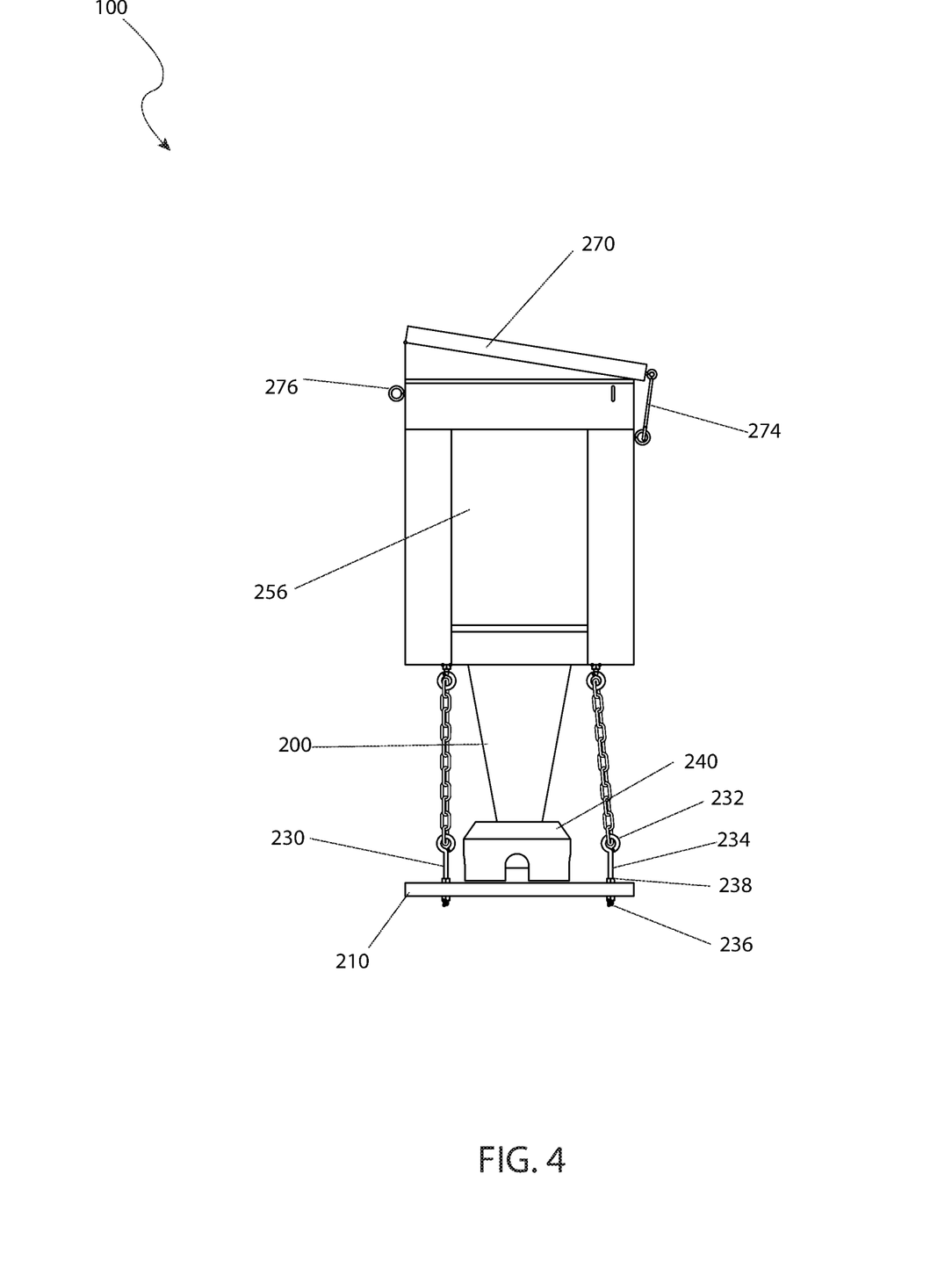
FIG. 4 is a left side view of a storm proof bird feeder, according to an embodiment of the present invention.
Figure 5:
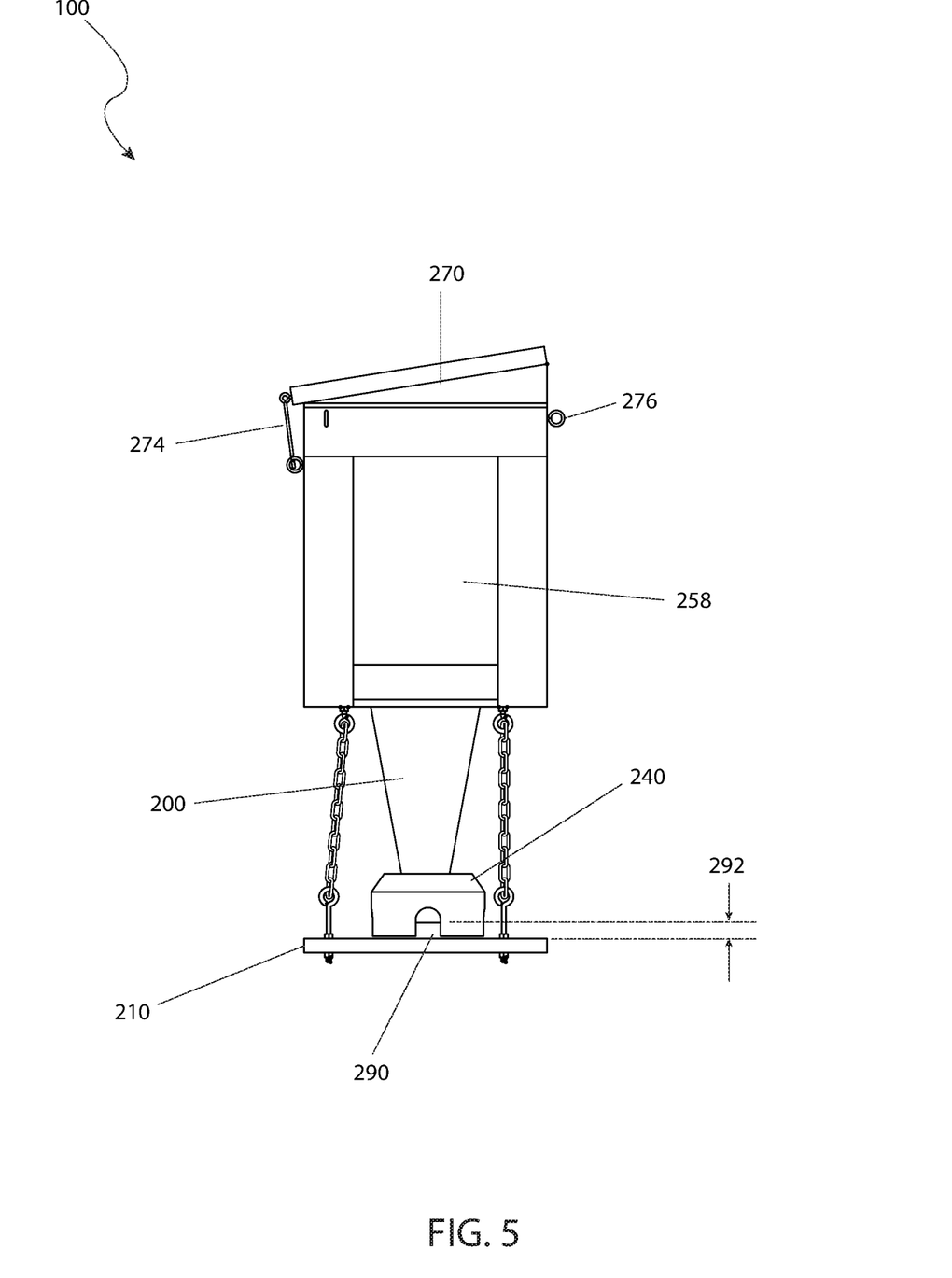
FIG. 5 is a right side view of a storm proof bird feeder, according to an embodiment of the present invention.
Figure 6:
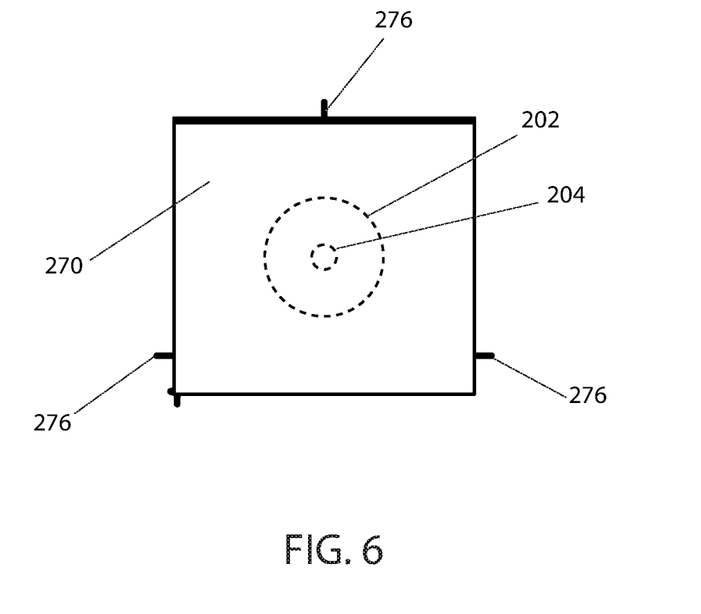
FIG. 6 is a top view of a storm proof bird feeder, according to an embodiment of the present invention; and, FIG. 7 is a bottom view of a storm proof bird feeder, according to an embodiment of the present invention.
Figure 7:
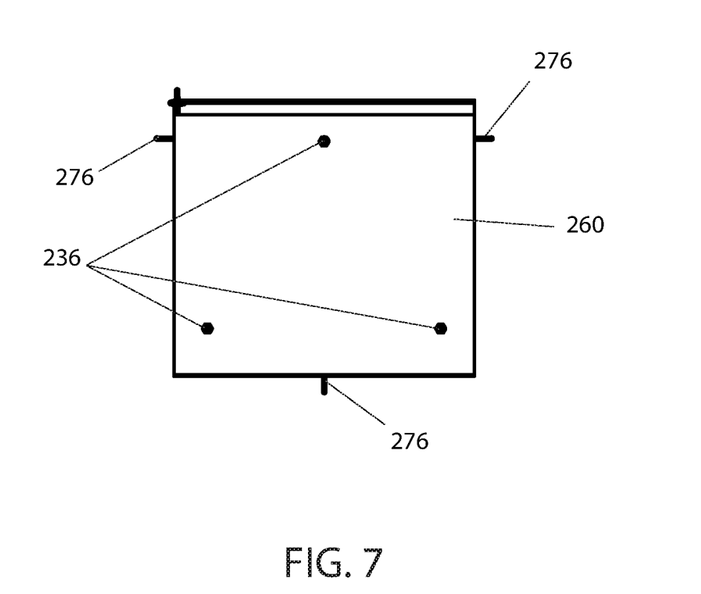

The lid 270 may cover the seed reservoir 250 to protect the bird seed 900. The lid 270 may be shaped to match the footprint of the seed reservoir 250. In some embodiments, the lid 270 may be hingedly coupled to the seed reservoir 250 by a hinge 272. In some embodiments, the hinged side of the lid 270 may be elevated higher than the opposing side of the lid 270 such that rain flows off of the lid 270. FIG. 4 illustrates an embodiment where the rear of the lid 270 is elevated higher than the front of the lid 270. In some embodiments, a lid latch 274 may prevent the lid 270 from being opened unless the lid latch 274 is released. FIG. 5 illustrates an embodiment where the lid 270 is held closed by the lid latch 274. The seed reservoir 250 may comprise a plurality of hanger couplers 276 disposed around the upper outside of the seed reservoir 250. A plurality of hangers may couple to the plurality of hanger couplers 276 to suspend the invention 100 from a tree limb, pole, or other supporting structure. The plurality of hanger couplers 276 may be placed such that the plurality of hangers do not interfere with the opening of the lid 270. As a non-limiting example, the plurality of hanger couplers 276 may be to the sides of the seed reservoir 250 at the front of the seed reservoir 250 such that the lid 270 may open upwards between the plurality of hangers. FIG. 6 (viewed from the top) and FIG. 7 (viewed from the bottom) illustrate an embodiment where the plurality of hanger couplers 276 are disposed on the front sides and rear center of the seed reservoir 250 to allow clearance for the lid 270 to open.

In use, the seed reservoir 250 may be suspended from a support structure via the plurality of hangers. The gap height 292 between the bottom of the feed dispensing tube 200 and the feeding plate 210 may be adjusted using the plurality of gap adjusters 214. The gap height 292 should be adjusted to be as least as large as the diameter of the bird seed 900 and may be made marginally higher to reduce the risk of clogging. The lid 270 may be opened by releasing the lid latch 274 and pivoting the lid 270 and the bird seed 900 may be poured into the seed reservoir 250. The lid 270 may be closed and latched. The floating collar 240 may be lifted to observe the flow of the dispensed seed 902 out of the bottom of the feed dispensing tube 200. The floating collar 240 may be lowered onto the feeding plate 210 to protect the dispensed seed 902 from the weather.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A storm proof bird feeder, comprising:
a feed dispensing tube having a top end, a bottom end, an upper aperture, and a lower aperture;
a feeding plate having a horizontally-oriented panel suspended below the feed dispensing tube by a plurality of gap adjusters and a plurality of adjuster apertures, each of the gap adjusters include a top anchor, an adjuster hanger, and an adjustable coupler;
a floating collar having a windscreen that encircles the bottom end of the feed dispensing tube, the floating collar having a top collar aperture, a bottom collar aperture, and a plurality of side notches;
a seed reservoir containing the bird seed for one or more birds to consume, the seed reservoir having a front side, a rear side, a left side, a right side, a bottom panel, and a lid, the bottom panel includes an outflow aperture, and the bird seed contained within the seed reservoir flows out of the bottom of the seed reservoir through the outflow aperture and into the feed dispensing tube; and
a gap height of a seed gap formed between the bottom of the feed dispensing tube and the feeding plate is adjustable such that the gap height is changed in correlation with the size of the bird seed dispensed, the gap height is adjusted to match the size of the bird seed being dispensed and having the seed gap surrounded by the floating collar to minimize the amount of dispensed seed that is blown away by wind.

2. The storm proof bird feeder, according to claim 1, wherein the upper aperture is an opening at the top end of the feed dispensing tube which allows the bird seed to fall from the seed reservoir into the feed dispensing tube that dispenses the bird seed from the seed reservoir onto the feeding plate from whence the bird seed is consumed.

3. The storm proof bird feeder, according to claim 1, wherein the feed dispensing tube is tapered into a frustum of an inverted cone.

4. The storm proof bird feeder, according to claim 1, wherein the gap adjusters couple to the feeding plate via the adjuster apertures.

5. The storm proof bird feeder, according to claim 1, wherein the top anchor is coupled to the underside of the bottom panel of the seed reservoir.

6. The storm proof bird feeder, according to claim 1, wherein the top end of the adjuster hanger is coupled to the top anchor and the bottom end of the adjuster hanger is coupled to the adjustable coupler.

7. The storm proof bird feeder, according to claim 1, wherein the adjustable coupler is coupled to the feeding plate and the length of the adjustable coupler from the top of the adjustable coupler to the feeding plate is adjustable.

8. The storm proof bird feeder, according to claim 7, wherein adjusting the length of the adjustable coupler alter the gap height of the seed gap between the feed dispensing tube and the feeding plate.

9. The storm proof bird feeder, according to claim 1, wherein the adjustable coupler includes an eye bolt, a wing nut, and a jam screw.

10. The storm proof bird feeder, according to claim 9, further comprising an eye of the eye bolt is coupled to the adjuster hanger and a threaded shank of the eye bolt passes through one of the adjuster apertures on the feeding plate.

11. The storm proof bird feeder, according to claim 9, wherein the wing nut screw onto the threaded shank of the eye bolt below the feeding plate such that the feeding plate rests on the wing nut.

12. The storm proof bird feeder, according to claim 9, wherein the jam screw is tightened to jam the wing nut such that the length of the adjustable coupler remains constant.

13. The storm proof bird feeder, according to claim 9, wherein the jam screw located above the feeding plate and tighten downwards against the feeding plate or the jam screw located beneath the wing nut and tighten upwards against the wing nut.

14. The storm proof bird feeder, according to claim 1, wherein the floating collar is tubular in shape with the feed dispensing tube oriented vertically.

15. The storm proof bird feeder, according to claim 1, wherein the feed dispensing tube descends through the top collar aperture located at the top of the floating collar.

16. The storm proof bird feeder, according to claim 1, wherein the side notches are openings in the side of the floating collar that are adjacent to the bottom collar aperture.

17. The storm proof bird feeder, according to claim 16, wherein the side notches connect to the bottom collar aperture and the floating collar provides the one or more birds access to the dispensed seed via the side notches.

18. The storm proof bird feeder, according to claim 1, wherein the front side, the rear side, the left side, the right side, or combinations thereof are transparent such that the level of the bird seed within the seed reservoir is visible from outside of the seed reservoir.

19. The storm proof bird feeder, according to claim 1, wherein the lid is hinged and elevated higher than the opposing side of the lid such that rain flows off of the lid.

20. The storm proof bird feeder, according to claim 1, wherein the gap height is decreased for smaller seeds and is increased for larger seeds.

\* \* \* \* \*